United States Patent
Weng et al.

(10) Patent No.: US 11,070,749 B2
(45) Date of Patent: Jul. 20, 2021

(54) IMAGE PROCESSING METHOD AND APPARATUS

(71) Applicant: SZ DJI TECHNOLOGY CO., LTD., Shenzhen (CN)

(72) Inventors: Chao Weng, Shenzhen (CN); Lei Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/887,865

(22) Filed: May 29, 2020

(65) Prior Publication Data
US 2020/0296305 A1  Sep. 17, 2020

Related U.S. Application Data

(63) Continuation of application No. PCT/CN2018/121523, filed on Dec. 17, 2018.

(51) Int. Cl.
| | | |
|---|---|---|
| *H04N 5/33* | (2006.01) | |
| *G06T 7/90* | (2017.01) | |
| *G06T 11/60* | (2006.01) | |
| *H04N 9/09* | (2006.01) | |

(52) U.S. Cl.
CPC ............... *H04N 5/332* (2013.01); *G06T 7/90* (2017.01); *G06T 11/60* (2013.01); *H04N 9/09* (2013.01); *G06T 2207/10048* (2013.01); *G06T 2207/20221* (2013.01); *H04N 2209/048* (2013.01)

(58) Field of Classification Search
CPC ........... H40N 5/332; G06T 7/90; G06T 11/60; H04N 9/09
See application file for complete search history.

(56) References Cited

U.S. PATENT DOCUMENTS

| | | | | |
|---|---|---|---|---|
| 5,598,225 A | * | 1/1997 | Songer | H04N 5/208 348/606 |
| 6,208,749 B1 | * | 3/2001 | Gutkowicz-Krusin | A61B 5/442 382/128 |
| 6,429,953 B1 | * | 8/2002 | Feng | H04N 9/045 348/234 |

(Continued)

FOREIGN PATENT DOCUMENTS

| | | |
|---|---|---|
| CN | 102547063 A | 7/2012 |
| CN | 104375375 A | 2/2015 |

(Continued)

OTHER PUBLICATIONS

Semary; A Proposed HSV-Based Pseudo Coloring Scheme for Enhancing Medical Image; DOI: 10.5121/csit.2018.80407; pp. 1-13 (Year: 2018).*

(Continued)

*Primary Examiner* — Peter D Le
(74) *Attorney, Agent, or Firm* — Anova Law Group, PLLC

(57) ABSTRACT

An image fusing method includes converting a first image into a first intermediate image, converting a second image into a second intermediate image including a plurality of components, fusing one of the plurality of components of the second intermediate image with the first intermediate image to obtain a fused component, and combining the fused component and other ones of the plurality of components of the second intermediate image to obtain a target image.

17 Claims, 8 Drawing Sheets

(56) References Cited

U.S. PATENT DOCUMENTS

| | | | | |
|---|---|---|---|---|
| 7,620,265 | B1* | 11/2009 | Wolff | G06T 5/50 382/254 |
| 8,531,562 | B2* | 9/2013 | Schmidt | H04N 5/33 348/262 |
| 8,724,894 | B1* | 5/2014 | Jensen | H04N 1/646 382/162 |
| 8,836,793 | B1* | 9/2014 | Kriesel | H04N 5/332 348/164 |
| 9,319,585 | B1* | 4/2016 | Liu | H04N 5/2258 |
| 2003/0068081 | A1* | 4/2003 | Jia | G06T 11/001 382/162 |
| 2004/0109178 | A1* | 6/2004 | Couwenhoven | B41J 2/17593 358/1.9 |
| 2004/0109180 | A1* | 6/2004 | Braun | H04N 1/6022 358/1.9 |
| 2004/0183812 | A1* | 9/2004 | Raskar | G06T 15/02 345/582 |
| 2006/0132660 | A1* | 6/2006 | Kurumisawa | G09G 3/2003 348/631 |
| 2006/0221090 | A1* | 10/2006 | Takeshima | G06T 7/194 345/582 |
| 2008/0240602 | A1* | 10/2008 | Adams | G06T 3/4015 382/266 |
| 2010/0092085 | A1* | 4/2010 | Marchesotti | G06T 7/194 382/173 |
| 2010/0245636 | A1* | 9/2010 | Kumar | H04N 9/045 348/273 |
| 2011/0063451 | A1* | 3/2011 | Kamon | H04N 9/045 348/164 |
| 2011/0109943 | A1* | 5/2011 | Qiao | H04N 1/6025 358/3.23 |
| 2011/0293179 | A1* | 12/2011 | Dikmen | G06T 5/008 382/167 |
| 2012/0218410 | A1* | 8/2012 | Kim | B60R 19/483 348/148 |
| 2013/0106837 | A1* | 5/2013 | Mukherjee | G06T 7/90 345/419 |
| 2013/0222892 | A1* | 8/2013 | Jesme | G03B 21/14 359/352 |
| 2013/0223735 | A1* | 8/2013 | Yang | H04N 1/58 382/167 |
| 2013/0229513 | A1* | 9/2013 | Ichitani | H04N 5/33 348/135 |
| 2014/0062863 | A1* | 3/2014 | Yu | G06F 3/005 345/156 |
| 2014/0168444 | A1 | 6/2014 | Bae et al. | |
| 2015/0009336 | A1* | 1/2015 | Wang | H04N 5/23229 348/165 |
| 2015/0023562 | A1* | 1/2015 | Moshfeghi | G06T 7/292 382/106 |
| 2015/0109454 | A1* | 4/2015 | Strandemar | G06T 5/50 348/164 |
| 2015/0145965 | A1* | 5/2015 | Livyatan | H04N 13/239 348/47 |
| 2015/0195500 | A1* | 7/2015 | Usui | G06K 9/00798 348/148 |
| 2016/0042527 | A1* | 2/2016 | Kim | G06K 9/2081 382/195 |
| 2016/0323518 | A1* | 11/2016 | Rivard | H04N 5/2258 |
| 2017/0078636 | A1* | 3/2017 | Cho | H04N 1/6027 |
| 2017/0094141 | A1* | 3/2017 | Hicks | H04N 9/07 |
| 2017/0154456 | A1* | 6/2017 | Cao | H04N 9/04 |
| 2017/0330053 | A1* | 11/2017 | Park | G06K 9/4661 |
| 2018/0089828 | A1* | 3/2018 | Wiles | G01N 33/56911 |
| 2018/0227509 | A1* | 8/2018 | Huang | H04N 9/646 |
| 2018/0262748 | A1* | 9/2018 | Shibata | G02B 27/32 |
| 2018/0332207 | A1* | 11/2018 | Yamamoto | H04N 5/2354 |
| 2018/0373123 | A1* | 12/2018 | Naiyang | G06T 7/207 |
| 2019/0068929 | A1* | 2/2019 | Sato | H04N 9/04553 |
| 2019/0124271 | A1* | 4/2019 | Sato | H04N 9/04515 |

FOREIGN PATENT DOCUMENTS

| | | |
|---|---|---|
| CN | 102334141 B | 5/2015 |
| CN | 104766290 A | 7/2015 |
| CN | 106548467 A | 3/2017 |
| CN | 107909562 A | 4/2018 |
| EP | 3136339 A1 | 3/2017 |

OTHER PUBLICATIONS

The World Intellectual Property Organization (WIPO) International Search Report and Written Opinion for PCT/CN2018/121523 dated Sep. 18, 2019 10 pages.

* cited by examiner

IMAGE PROCESSING METHOD AND APPARATUS

CROSS-REFERENCE TO RELATED APPLICATION

This application is a continuation of International Application No. PCT/CN2018/121523, filed Dec. 17, 2018, the entire content of which is incorporated herein by reference.

TECHNICAL FIELD

The present disclosure relates to image processing and, more particularly, to an image fusing method, an image acquisition apparatus, and a terminal device.

BACKGROUND

Image acquisition apparatuses equipped with multiple image sensors have been widely used to acquire images. Images acquired through different image sensors may contain different information of a photographing scene. For example, a camera equipped with a visible-light image sensor and an infrared image sensor can capture a visible-light image and an infrared image for a certain photographing scene. The visible-light image can show a clearer color feature and a more distinguished edge profile of objects appearing at the photographing scene. The infrared image can present heat distribution of the photographing scene, but usually has a lower clarity than the visible-light image. An image obtained by fusing the visible-light image and the infrared image may show a variety of information of the photographing scene.

To facilitate the user to preview and compare the visible-light image and the infrared image, the image acquisition apparatus may fuse the visible-light image and the infrared image into one image and display the fused image to the user. However, a fused image acquired by the image acquisition apparatus through implementing existing image fusing methods usually cannot have both features of the visible-light image and features of the infrared image, e.g., the distinguished edge profile and the heat distribution.

SUMMARY

In accordance with the disclosure, there is provided an image fusing method including converting a first image into a first intermediate image, converting a second image into a second intermediate image including a plurality of components, fusing one of the plurality of components of the second intermediate image with the first intermediate image to obtain a fused component, and combining the fused component and other ones of the plurality of components of the second intermediate image to obtain a target image.

Also in accordance with the disclosure, there is provided an image acquisition apparatus including a first image sensor, a second image sensor, a processor coupled to the first image sensor and the second image sensor, and a memory couple to the processor. The memory stores instructions that, when executed by the processor, cause the processor to obtain a first image through the first image sensor, obtain a second image through the second image sensor, convert a first image into a first intermediate image, convert a second image into a second intermediate image including a plurality of components, fuse one of the plurality of components of the second intermediate image with the first intermediate image to obtain a fused component, and combine the fused component and other ones of the plurality of components of the second intermediate image to obtain a target image.

Also in accordance with the disclosure, there is provided a terminal device including a processor and a memory couple to the processor. The memory stores instructions that when executed by the processor, cause the processor to obtain a first image and a second image, convert a first image into a first intermediate image, convert a second image into a second intermediate image including a plurality of components, fuse one of the plurality of components of the second intermediate image with the first intermediate image to obtain a fused component, and combine the fused component and other ones of the plurality of components of the second intermediate image to obtain a target image.

Also in accordance with the disclosure, there is provided an image fusing method including obtaining a grayscale image, obtaining a color image including a plurality of components, combining, by weighted fusion, the grayscale image with one of the plurality of components of the color image to obtain a fused component, and combing the fused components and other ones of the plurality of components of the color image to obtain a target image. A first weight for the grayscale image in the weight fusion depending on intensity of the grayscale image. A second weight for the one of the plurality of components of the color image in the weighted fusion depending on the first weight.

DETAILED DESCRIPTION

Figure 1:
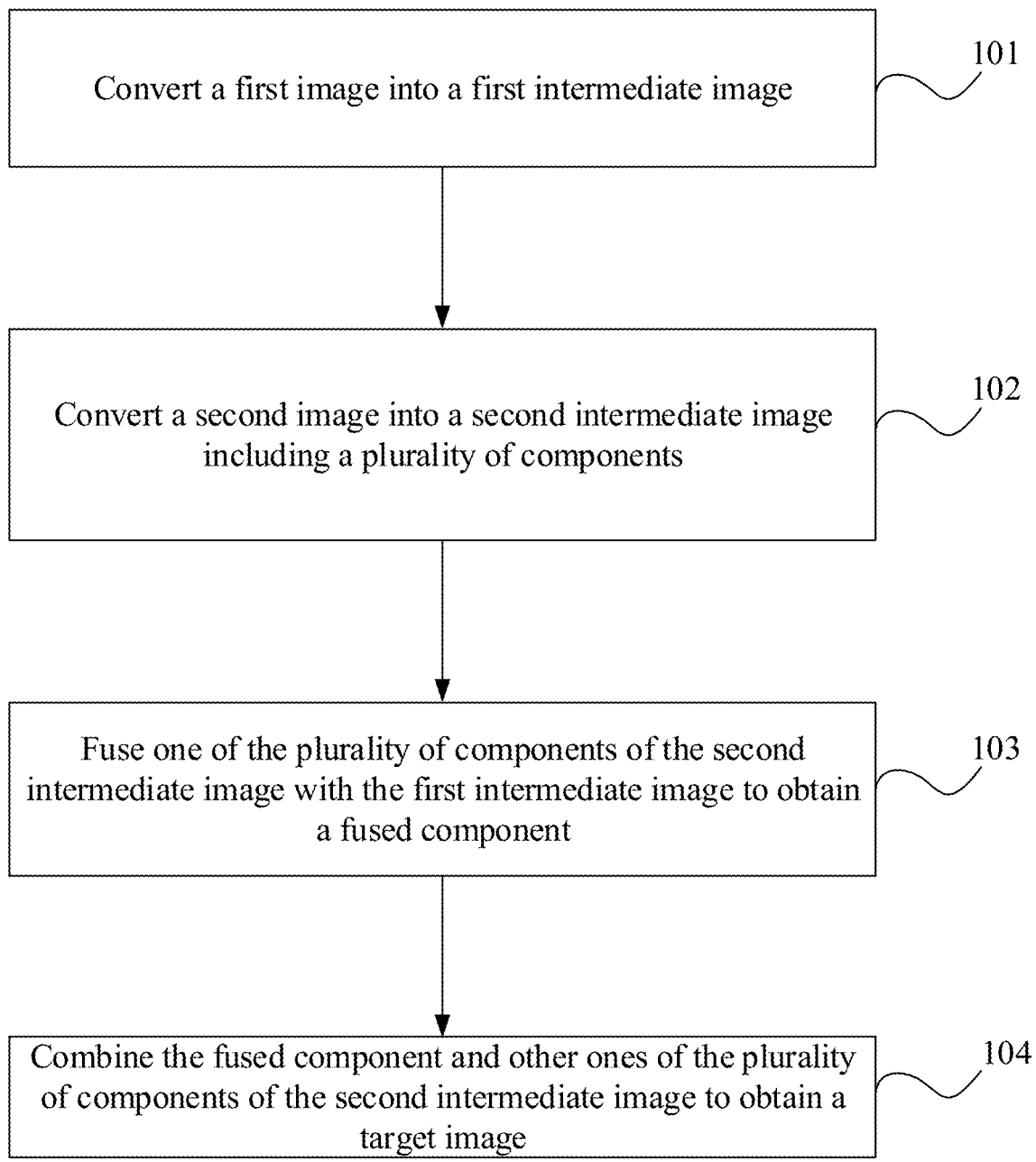
FIG. 1 is a flow chart of an image fusing method according to some embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

An image acquisition apparatus, e.g., a camera, may include different image sensors. For example, a camera can be equipped with different image sensors including a first image sensor and a second image sensor. For example, the first image sensor may be a visible-light image sensor and can capture a visible-light image, while the second image sensor may be an infrared image sensor and can capture an infrared image. Compared to the infrared image, the visible-light image can show a clearer color feature and a more distinguished edge profile of objects appearing at the photographing scene. The infrared image can present heat distribution of the photographing scene, but usually has a lower clarity than the visible-light image. An image obtained by fusing the visible-light image and the infrared image can show a variety of information of the photographing scene.

The image acquisition apparatus may be carried by an unmanned vehicle, e.g. an unmanned aerial vehicle, to acquire a visible-light image and an infrared image of a photographing scene. For example, the photographing scene may be a reaction tower of a chemical process. The infrared image of the reaction tower can show heat distribution of the reaction tower. Based on the infrared image, it is possible to determine whether there is a portion of reaction power having a risk of overheating. However, in some scenarios, the overheated portion may not be located only based on the infrared image of the reaction chamber. The visible-light image of the reaction tower may not show heat distribution but can clearly show a shape, colors, and an edge profile of the reaction tower, such that it is easy to locate a portion of the reaction tower according to the visible-light image. Thus, it is needed to obtain a fused image of the infrared image and the visible-light image to locate the overheated portion of the reaction chamber.

To facilitate a user to preview and compare the visible-light image and the infrared image, the image acquisition apparatus may fuse the visible-light image and the infrared image into one image for displaying. The present disclosure provides an image fusing method, and an image acquisition apparatus and a terminal device that can implement the method. The image acquisition apparatus or the terminal device may include a memory and a processor. The memory and the processer can be integrated on one chip or be provided as separate components. The memory can store a plurality of instructions. When executed by the processor, the instructions can cause the processor to implement a method consistent with the disclosure, such as one of the example methods described below.

FIG. 1 is a flow chart of an image fusing method 100 according to some embodiments of the present disclosure. As shown in FIG. 1, the image fusing method 100 includes the following processes.

At 101, a first image is converted into a first intermediate image.

At 102, a second image is converted into a second intermediate image, where the second intermediate image includes a plurality of components.

In some embodiments, the first image and the second image may correspond to the same photographing scene. The photographing scene may include one or more target objects. A representation of a target object in the first image matches a representation of a target object in the second image. In some embodiments, a representation of each of the one or more target objects in the first image matches a representation of each of the one or more target objects in the second image.

In some embodiments, the first image may be obtained through a first image sensor and the second image may be obtained through a second image sensor.

In some embodiments, the first image and the second image can be images captured by the first image sensor and the second image sensor, respectively, without undergoing any pre-processing, such as calibration. The first image and the second image can be captured at the same time, or at different times, and can have the same or similar contents. In one example, for the same photographing scene, if the first image and the second image are captured at the same time, the first image and the second image can have the same or similar contents. In another example, for a same stationary photographing scene, even if the first image and second image are not captured at the same time, the first image and the second image can still include the same or similar contents because, e.g., the scene does not change. The first image and the second image may be captured by the same image acquisition apparatus (e.g., a camera), or different image acquisition apparatuses (e.g., different cameras).

In some embodiments, an image acquisition apparatus may include a beam splitter to split a beam of incident light to a first beam (e.g., a visible-light portion of the incident light) and a second beam (e.g., an infrared portion of the incident light). The first image sensor can capture the first image by sensing the first beam and the second image sensor can capture the second image by sensing the second beam. In this case, a field of view (FOV) of the first image is the same as or similar to an FOV of the second image. A representation of a target object in the first image matches a representation of a target object in the second image. In some embodiments, a representation of each of the one or more target objects in the first image matches a representation of each of the one or more target objects in the second image.

In some other embodiments, the first image and the second image are obtained by processing a first raw image and a second raw image, respectively. The first raw image and the second raw image can be captured at the same time, or at different times, and can have the same or similar contents. In one example, for the same photographing scene, if the first raw image and the second raw image are captured at the same time, the first raw image and the second raw image can have the same or similar contents. In another example, for a same stationary photographing scene, even if the first raw image and second raw image are not captured at the same time, the first raw image and the second raw image can still include the same or similar contents because, e.g., the scene does not change. The first raw image and the second raw image may be captured by the same image acquisition apparatus (e.g., a camera), or different image acquisition apparatuses (e.g., different cameras).

Figure 2A:
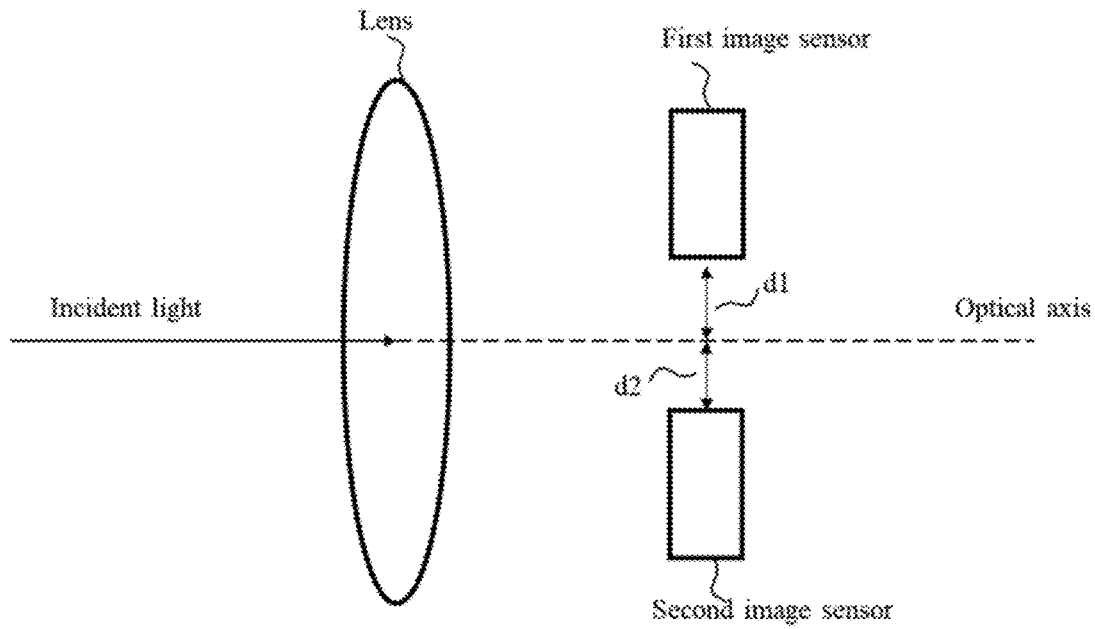
FIG. 2A is an example of arrangement for a first image sensor and a second image sensor in an image acquisition apparatus according to some embodiments of the present disclosure.
Figure 2B:
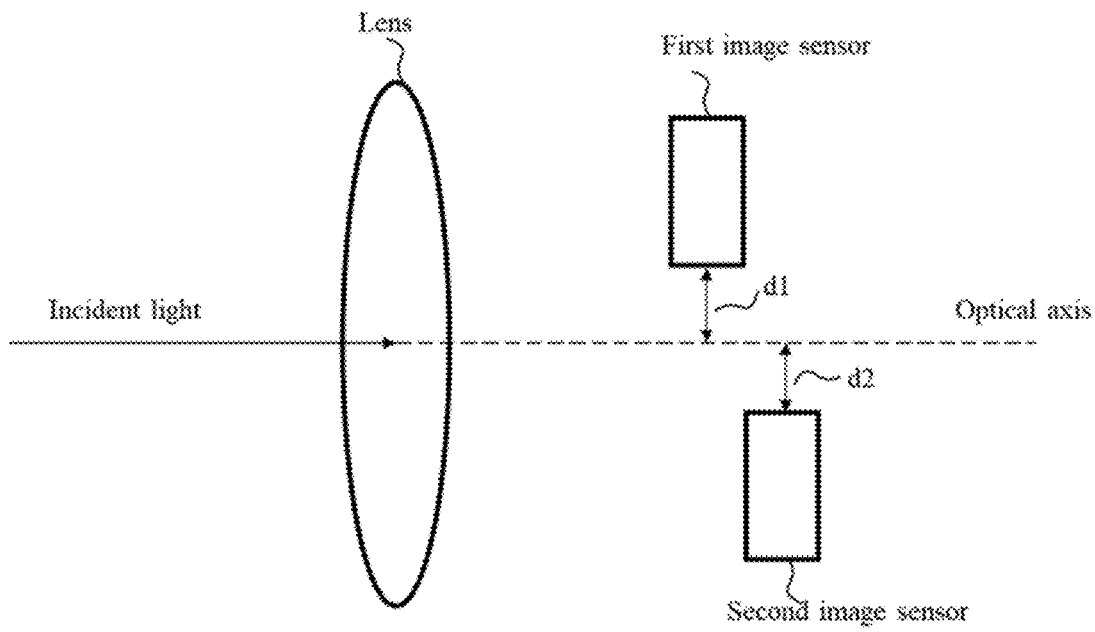
FIG. 2B is another example of arrangement for a first image sensor and a second image sensor in an image acquisition apparatus according to some embodiments of the present disclosure.

In some embodiments, the first raw image may be captured by the first image sensor by sensing incident light of a first photographing scene, and the second raw image may be captured by the second image sensor by sensing incident light of a second photographing scene. The first photographing scene is similar to or same as the second photographing scene. The relation between the first photographing scene and the second photographing scene may be related to an arrangement of the first image sensor and the second image sensor. For example, the first image sensor and the second image sensor may be disposed at different positions inside the image acquisition apparatus. FIGS. 2A and 2B show example arrangements of the first image sensor and the second image sensor consistent with embodiments of the disclosure. As shown in FIG. 2A, the first image sensor and the second image sensor are disposed with a distance d1 and a distance d2, respectively, relative to an optical axis of a lens inside the image acquisition apparatus. A line connecting the first image sensor and the second image senor may be perpendicular to the optical axis. The distance d1 may be equal to or different from the distance d2 according to actual product design requirements and/or manufacture conditions. The example arrangement shown in FIG. 2B is similar to that shown in FIG. 2A, except that in the arrangement shown in FIG. 2B, the line connecting the first image sensor and the second image sensor is not perpendicular to the optical axis.

The first raw image and the second raw image can be processed to obtain the first image and the second image, respectively. In some embodiments, the first raw image may be calibrated according to the second raw image to generate the first image, and the second raw image can be set as the second image. In some other embodiments, the second raw image may be calibrated according to the first raw image to generate the second image, and the first raw image can be set as the first image.

In some other embodiments, the first raw image and the second raw image can be both calibrated, for example, according to a calibration assembly, to generate the first image and the second image. The calibration assembly may be a calibration board. Through the calibration assembly, the image acquisition apparatus can obtain calibration parameters, e.g. parameters related to pixel coordinates. According to the calibration parameters, the first raw image and the second raw image can be calibrated to generate the first image and the second image, respectively.

In some embodiments, calibration of a raw image, e.g., the first raw image or the second raw image, can include rotating, resizing, and/or translationally moving the raw image. In some embodiments, calibration of the raw image can additionally or alternatively include tailoring the raw image according to another raw image or according to the calibration assembly. In some embodiments, the first image obtained by calibrating the first raw image may have the same resolution as the second image obtained by calibrating the second raw image. In some other embodiments, the first image may have different resolution from the second image. For example, the first image may have a larger resolution than the second resolution.

In some embodiments, the first image sensor can be a visible-light image sensor and the second image sensor can be an infrared image sensor. The first image sensor and the second image sensor may be a same type of image sensor or different types of image sensors. For example, each of the first image sensor and the second image sensor can include a charge coupled device (CCD) image sensor, a complementary metal oxide semiconductor (CMOS) image sensor, or another type of image sensor. Further, each of the first image sensor and the second image sensor may be a visible-light image sensor, an infrared image senor, or an image sensor configured to sense light within another wavelength range. For example, the visible-light image sensor can sense light in a visible-light wavelength range (e.g., about 390 nm to about 700 nm) and capture the visible-light image. The infrared image sensor can sense light in an infrared wavelength range (e.g., about 700 nm to about 1 mm) and capture the infrared image. The image sensor configured to sense light within another wavelength range can include, for example, an ultraviolet (UV) image sensor, which can sense light in a UV wavelength range (e.g., about 10 nm to about 400 nm) and capture a UV image. Accordingly, the first image or the second image may be the visible-light image, the infrared image, the UV image, or an image containing certain colors.

In some embodiment, the first image may be a visible-light image acquired through a visible-light image sensor as the first image sensor, and the second image may be an infrared image acquired through an infrared image sensor as the second image sensor.

The first image can be an image of any suitable color model (color space), such as an RGB (red, green, and blue) image, an HSV (hue, saturation, and value (brightness)) image, an HSL (hue, saturation, and lightness) image, an Lab (lightness, green-red (a-component), and blue-yellow (b-component)), a YUV (luminance, blue-chrominance, and red-chrominance) image, a Y'UV (luma, blue-chrominance, and red-chrominance), a YCbCr (luminance, blue-difference, and red-difference), a YPbPr (analog version of YCbCr), or a CMYK (cyan, magenta, yellow, and black) image. The first intermediate image can be an image having only one component indicating associated light intensity, such as a grayscale image.

In some embodiments, the first image can be an image of a color model without an individual intensity-related component (such as an RGB image or a CMYK image). In these embodiments, the first image can be converted to the first intermediate image according to any suitable approach. For example, the first image may be an RGB image, and each of the R-component, G-component, and B-component may carry corresponding grayscale information. The grayscale information of any of the three components can be extracted to form a grayscale image as the first intermediate image, or the grayscale information of any two or more of the three components can be extracted and combined to form the grayscale image. Alternatively, the RGB image may be converted to another type of image having an individual intensity-related component, e.g., an HSV image, an HSL image, an Lab image, a YUV image, a Y'UV image, a YCbCr image, or a YPbPr image, the intensity-related component (V-component of the HSV image, L-component of the HSL image, L-component of the Lab image, Y-component of the YUV image, Y'-component of the Y'UV image, Y-component of the YCbCr image, or Y-component of the YPbPr image) of which can be extracted to form the grayscale image as the first intermediate image. If the first image is a CMYK image, it can be processed in a similar manner as the RGB image to obtain a grayscale image as the first intermediate image.

In some embodiments, the first image can be an image of a color model with an individual intensity-related component (such as an HSV image, an HSL image, an Lab image, a YUV image, a Y'UV image, a YCbCr image, or a YPbPr image, which includes one component representing the lightness, brightness, gray level or other similar image features), and can be acquired through the first image sensor or converted from an RGB image or another type of image. In these embodiments, the intensity-related component (such as the V-component of the HSV image, the L-component of the HSL image, the L-component of the Lab image, the Y-component of the YUV image, the Y'-component of the Y'UV image, the Y-component of the YCbCr image, or the Y-component of the YPbPr image) can be extracted to form a grayscale image as the first intermediate image.

The second image can be an image of any suitable color model (color space), such as an RGB image, an HSV image, and HSL image, an Lab image, a YUV image, a Y'UV image, a YCbCr image, a YPbPr image, or a CMYK image. The second intermediate image can be an image having a plurality of components (e.g., three components) and one of the components indicates associated light intensity.

In some embodiments, the second image can be an image of a color model without an individual intensity-related component (such as an RGB image or a CMYK image). In these embodiments, the second image can be converted to an image of a color model having an individual intensity-related component (such as an HSV image, an HSL image, an Lab image, a YUV image, a Y'UV image, a YCbCr image, or a YPbPr image) as the second intermediate image, and the intensity-related component of the second intermediate image can be used to fuse with the first intermediate image. For example, the second image can be an RGB image and can be converted into a YUV image as the second intermediate image. The Y-component of the YUV image can be used to fuse with the first intermediate image. Alternatively, the RGB image can be converted into an HSV image, an HSL image, an Lab image, a Y'UV image, a YCbCr image, or a YPbPr image as the second intermediate image, and the V-component of the HSV image, the L-component of the HSL image, the L-component of the Lab image, the Y'-component of the Y'UV image, the Y-component of the YCbCr image, or the Y-component of the YPbPr image can be used to fuse with the first intermediate image. If the second image is a CMYK image, it can be processed in a similar manner as the RGB image to obtain an image having an individual intensity-related component as the second intermediate image.

In some embodiments, the second image can be an image of a color model with an individual intensity-related component (such as an HSV image, an HSL image, an Lab image, a YUV image, a Y'UV image, a YCbCr image, or a YPbPr image, which includes one component representing the lightness, brightness, gray level or other similar image features), and can be acquired through the second image sensor or converted from an RGB image or another type of image. In these embodiments, the second image can be used directly as the second intermediate image, or be converted to another image of a color model with an individual intensity-related component as the second intermediate image.

Referring again to FIG. 1, at 103, one of the plurality of components of the second intermediate image is fused with the first intermediate image to obtain a fused component.

In some embodiments, the first image (e.g., the visible-light image) can be converted to the grayscale image as the first intermediate image. The second image (e.g., the infrared image) can be converted to the YUV image as the second intermediate image. The YUV image includes the Y-component, the U-component, and the V-component. The Y-component of the YUV image can be fused with the grayscale image to obtain a fused component, e.g., a fused Y-component for a target image.

In some embodiments, the first intermediate image can include a grayscale image formed by a V-component of an HSV image obtained by the first image sensor or derived from another image obtained by the first image sensor. The second intermediate image may be another HSV image obtained by the second image sensor or derived from another image obtained by the second image sensor. The V-component of the second intermediate image can be fused with the grayscale image to obtain a fused component, e.g., a fused V-component for the target image.

In some embodiments, the first intermediate image can include a grayscale image formed by an L-component of an HSL image obtained by the first image sensor or derived from another image obtained by the first image sensor. The second intermediate image may be another HSL image obtained by the second image sensor or derived from another image obtained by the second image sensor. The L-component of the second intermediate image can be fused with the grayscale image to obtain a fused component, e.g., a fused L-component for the target image.

In some embodiments, the first intermediate image can include a grayscale image formed by an L-component of an Lab image obtained by the first image sensor or derived from another image obtained by the first image sensor. The second intermediate image may be another Lab image obtained by the second image sensor or derived from another image obtained by the second image sensor. The L-component of the second intermediate image can be fused with the grayscale image to obtain a fused component, e.g., a fused L-component for the target image.

In some embodiments, the first intermediate image can include a grayscale image formed by a Y'-component of an Y'UV image obtained by the first image sensor or derived from another image obtained by the first image sensor. The second intermediate image may be another Y'UV image obtained by the second image sensor or derived from another image obtained by the second image sensor. The Y'-component of the second intermediate image can be fused with the grayscale image to obtain a fused component, e.g., a fused Y'-component for the target image.

In some embodiments, the first intermediate image can include a grayscale image formed by a Y-component of an YCbCr image obtained by the first image sensor or derived from another image obtained by the first image sensor. The second intermediate image may be another YCbCr image obtained by the second image sensor or derived from another image obtained by the second image sensor. The Y-component of the second intermediate image can be fused with the grayscale image to obtain a fused component, e.g., a fused Y-component for the target image.

In some embodiments, the first intermediate image can include a grayscale image formed by a Y-component of an YPbPr image obtained by the first image sensor or derived from another image obtained by the first image sensor. The second intermediate image may be another YPbPr image obtained by the second image sensor or derived from another image obtained by the second image sensor. The Y-component of the second intermediate image can be fused with the grayscale image to obtain a fused component, e.g., a fused Y-component for the target image.

In some embodiments, the one of the plurality of components of the second intermediate image can be fused with the first intermediate image at the pixel level, i.e., by performing the fusing pixel by pixel. In some embodiments, a fused component of a certain pixel of the target image can be obtained by calculating a weighted sum of a first pixel value at a first pixel of the first intermediate image that corresponds to the certain pixel of the target image and a second pixel value of the one of the plurality of components at a second pixel of the second intermediate image that corresponds to the certain pixel of the target image. That is, the pixel value of the fused component of the certain pixel can be a sum of a multiplication of the first pixel value and a first weight and a multiplication of the second pixel value and a second weight. A sum of the first weight and the second weight can be one (1).

For example, in the scenario that the second intermediate image is a YUV image, the Y-component of the YUV image can be fused with the grayscale image using the following equation.

$$\text{Fused } Y = a \times \text{gray scale} + b \times Y$$

where a is a first weight for the first pixel value at the first pixel of the first intermediate image (e.g., the grayscale image converted from the visible-light image), b is a second weight for the second pixel value of the one (e.g., the Y-component) of the plurality of components at the second pixel of the second intermediate image (e.g., the YUV image converted from the infrared image), and a+b=1.

A similar equation can be applied to fuse the V-component of the HSV image (the second intermediate image) with the grayscale image (the first intermediate image), the L-component of the HSL image (the second intermediate image) with the grayscale image (the first intermediate image), the L-component of the Lab image (the second intermediate image) with the grayscale image (the first intermediate image), the Y'-component.

The weights used in the above fusing process can be determined according to various approaches. In some embodiments, the weights may depend on gradients in the first intermediate image. For example, after the first image is converted to the grayscale image as the first intermediate image, a gradient operator may be applied at the first pixel of the grayscale image to calculate a gradient at the first pixel, and the first and second weights can be determined according to the gradient at the first pixel. In some embodiments, the gradient can be obtained by calculating a change between two or more of pixel values of the first pixel and one or more neighboring pixels in proximity of the first pixel.

In some embodiments, the first weight can be determined according to a gradient at the first pixel of the first intermediate image. For example, the first weight may be positively related to the gradient, e.g., positively proportional to the gradient. The second weight can be determined based on the first weight. For example, the second weight may equal one minus the first weight.

In some embodiments, the first weight can be determined according to an intensity (gray scale) at the first pixel of the first intermediate image. For example, the first weight may be positively related to the intensity (gray scale), e.g., positively proportional to the intensity (gray scale). The second weight can be determined based on the first weight. For example, the second weight may equal one minus the first weight.

In some embodiments, the first intermediate image may be converted to an edge-profile image, and the first weight can be determined according to, such as positively related to, an intensity (gray scale) at a pixel of the edge-profile image corresponding to the first pixel of the first intermediate image. For example, the first intermediate image may include one or more objects, and an edge profile for each of the one or more objects may be determined by, e.g., an edge detection method. The first weight may be related to an intensity of the edge profile. For example, the first weight may be positively proportional to the intensity of the edge profile. The second weight can be determined based on the first weight. For example, the second weight may equal one minus the first weight.

At 104, the fused component is combined with other ones of the plurality of components of the second intermediate image to obtain the target image.

In the scenario where the second intermediate image is a YUV image, the fused Y-component can be combined with the U-component of the YUV image and the V-component of the YUV image to obtain a fused YUV image as the target image.

In the scenario where the second intermediate image is an HSV image, the fused V-component can be combined with the H-component and S-component of the second intermediate image to obtain a fused HSV image as the target image.

In the scenario where the second intermediate image is an HSL image, the fused L-component can be combined with the H-component and S-component of the second intermediate image to obtain a fused HSL image as the target image.

In the scenario where the second intermediate image is an Lab image, the fused L-component can be combined with the a-component and b-component of the second intermediate image to obtain a fused Lab image as the target image.

In the scenario where the second intermediate image is a Y'UV image, the fused Y'-component can be combined with the U-component and V-component of the second intermediate image to obtain a fused Y'UV image as the target image.

In the scenario where the second intermediate image is a YCbCr image, the fused Y-component can be combined with the Cb-component and Cr-component of the second intermediate image to obtain a fused YCbCr image as the target image.

In the scenario where the second intermediate image is a YPbPr image, the fused Y-component can be combined with the Pb-component and Pr-component of the second intermediate image to obtain a fused YPbPr image as the target image.

In some embodiments, the method 100 may further include converting the target image into an output image and displaying the output image through a display screen. The target image may be further processed to obtain the output image for displaying through the display screen. For example, the target image may be resized or tailored to obtain the output image according to displaying requirements of the display screen or a user. A type of the output image may be determined according to a device requirement of the display screen. A type of the output image may be same as or different from the target image. For example, the target image may be a YUV image, an HSV image, an HSL image, an Lab image, a Y'UV image, a YCbCr image, a YPbPr image, or another type of image, and the output image may be a different type of image, e.g., an RGB image. In some embodiments, the target image may be output directly as the output image.

Figure 3A:
FIG. 3A shows an example of a first image according to some embodiments of the present disclosure.
Figure 3B:
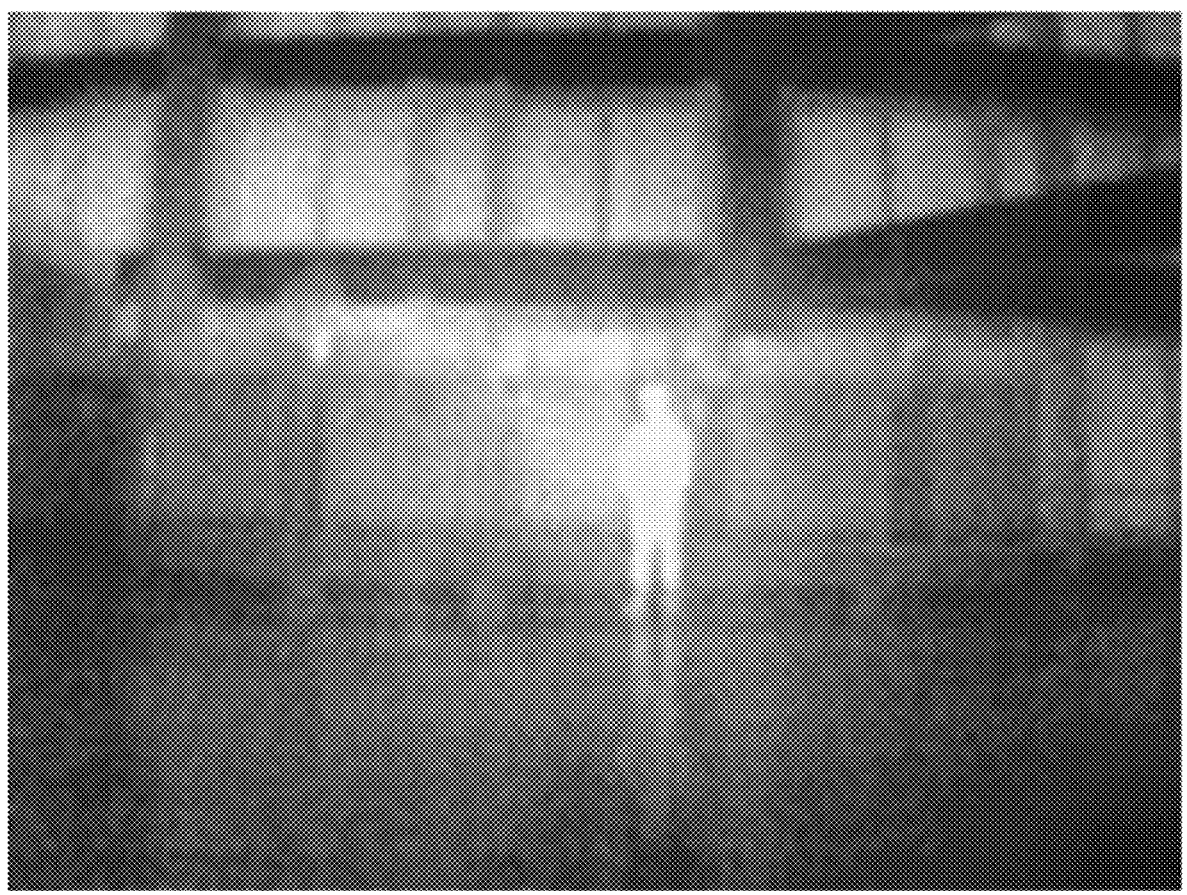
FIG. 3B shows an example of a second image according to some embodiments of the present disclosure.
Figure 3C:
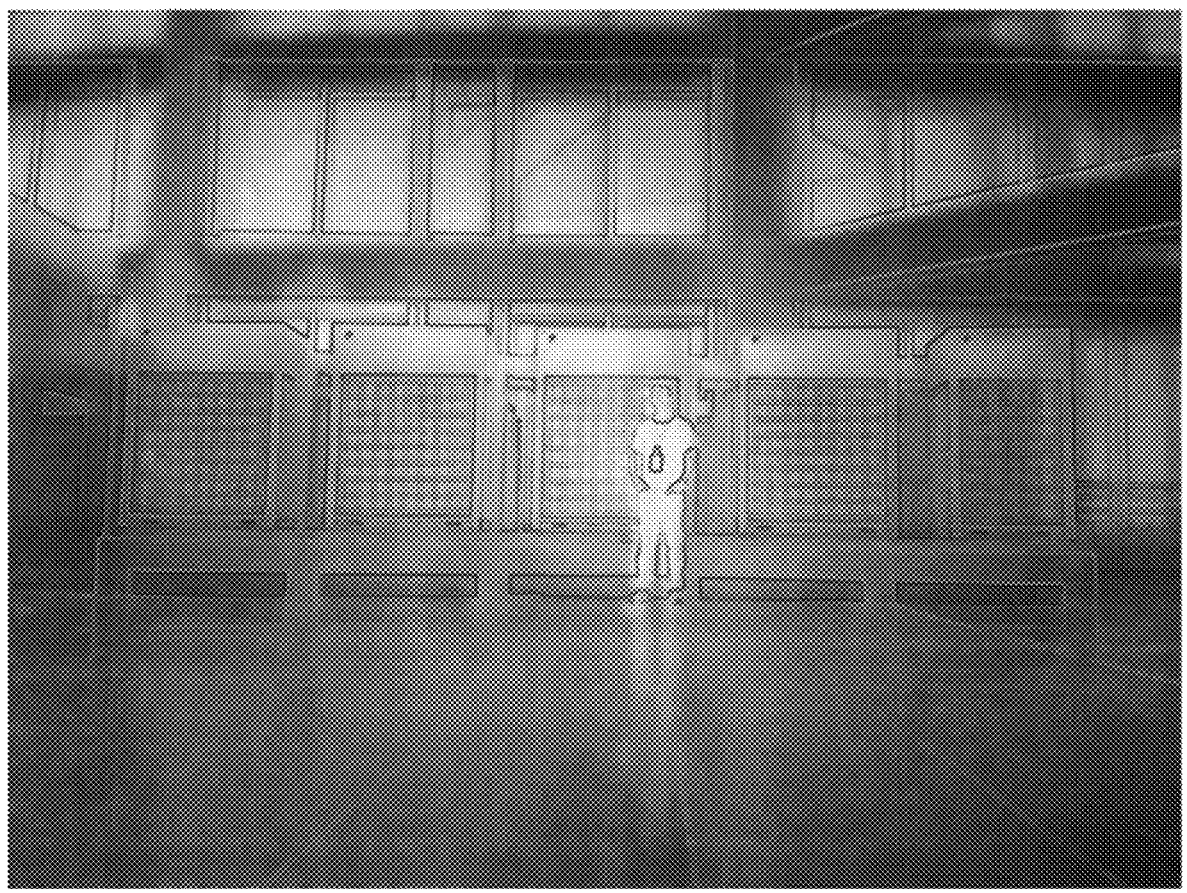
FIG. 3C shows an example of a target image obtained based on the first image shown in FIG. 3A and the second image shown in FIG. 3B using an image fusing method according to some embodiments of the present disclosure.

FIGS. 3A-3C show an example of fusing a visible-light image shown in FIG. 3A and an infrared image shown in FIG. 3B to obtain a target image shown in FIG. 3C according to some embodiments of the present disclosure. The visible-light image of FIG. 3A shows a person and several boxes (e.g., five boxes) behind the person. The person and the five boxes may be considered as the target objects. The edges of the target objects in the visible-light image are sharp and clear. The infrared image of FIG. 3B was taken for a similar photographing scene, which includes the same target objects (e.g., the person and the five boxes). The infrared image is able to show a heat distribution of the photographing scene. For example, compared to the five boxes, the person as an alive object can have higher temperature, and correspondingly in the infrared image, a representation of the person is brighter than representations of the five boxes. However, it is difficult to distinguish the edges of the target objects shown in the infrared image. Using the image fusing method consistent with the present disclosure, the target image of FIG. 3C can be obtained by fusing the visible-light image and the infrared image. As shown in FIG. 3C, the target image can show both distinguishable edges of target objects and the heat distribution of the photographing scene.

Figure 4:
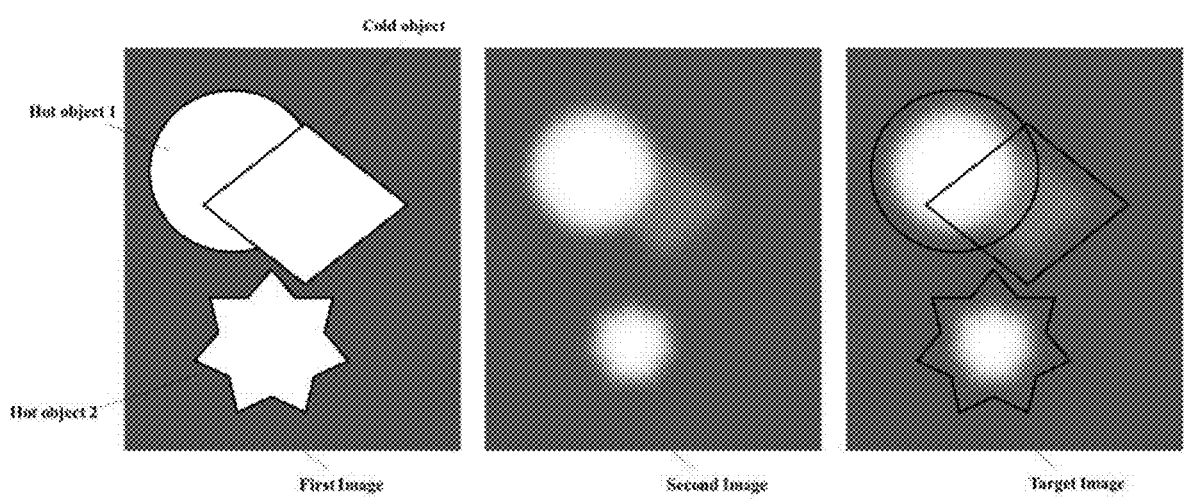
FIG. 4 shows an example of obtaining a target image using an image fusing method according to some embodiments of the present disclosure.

Using the image fusing method 100 shown in FIG. 1, the first image and the second image can be fused to obtain the target image having both desired features of the first image and the second image. The target image can show a variety of information of the photographing scene. The target image can show distinguishable edges of the target objects in the photographing scene and the heat distribution of the photographing scene. FIG. 4 shows another example of obtaining the target image by fusing the first image and the second image using the image fusing method consistent with the present disclosure. As shown in FIG. 4, the first image (e.g., a visible-light image) includes three target objects: a round-shape hot object 1, a star-shape hot object 2, and a rhombus-shape cold object. The hot object 1 is partially coved by the cold object. All three target objects have the same white color in the first image. In the second image (e.g., an infrared image) for the same three target objects, however, the hot object 1 is not partially covered by the cold object. In the second image, because the hot objects have higher temperature than the cold object, the hot object 1 and the hot object 2 are brighter than the cold object. However, the second image shows the target objects with blurry edges. Specifically, it is difficult to identify the shape of the hot object 2. Consistent with the embodiments of the disclosure, the first image and the second image can be fused to obtain a target image, which can show sharp edges and temperature differences among the three target objects. In addition, the portion of the hot object 1 covered by the cold object can also be shown in the target objects.

In view of above, using the image fusing method to obtain fused images can allow showing of a variety of desired information including distinguishable edges of target objects, heat distribution of the photographing scene, and hidden objects, etc., facilitating applications in e.g., remote sensing detection, environmental protection, safety navigation, traffic monitoring, or medical image processing.

Figure 5:
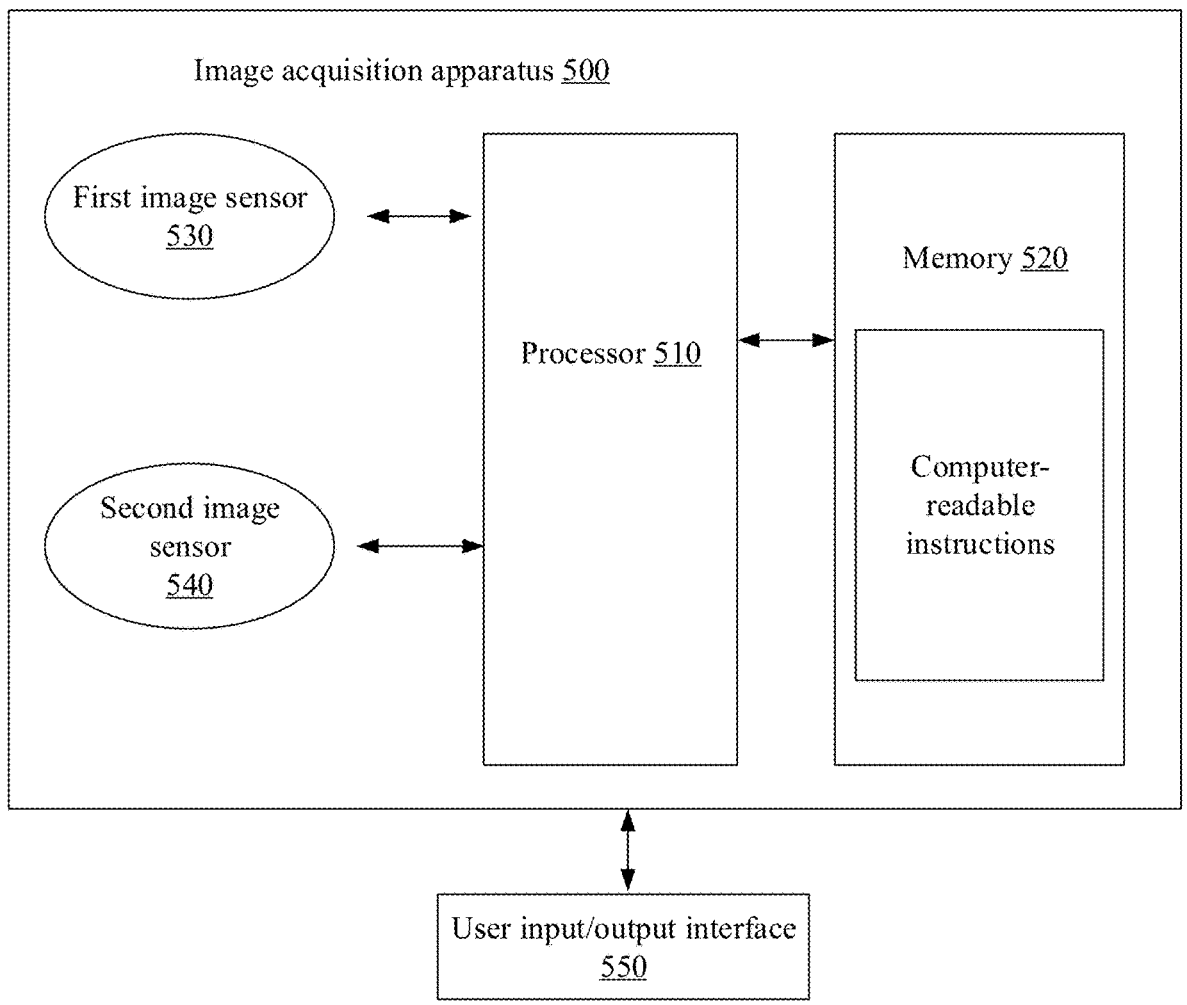
FIG. 5 schematically illustrates an image acquisition apparatus according to some embodiments of the present disclosure.

Another aspect of the present disclosure provides an image acquisition apparatus. FIG. 5 schematically illustrates an image acquisition apparatus 500 according to some embodiments of the present disclosure. The image acquisition apparatus 500 may be a camera, a photographing assembly mounted on an unmanned aerial vehicle, a mobile phone, a tablet, or another apparatus with an image acquisition function. As shown in FIG. 5, the image acquisition apparatus 500 includes one or more of the following components: a processor 510, a memory 520, a first image sensor 530, a second image sensor 540, and a user input/output interface 550.

The processor 510 may be configured to control operations, e.g., photographing, image processing, image displaying, etc., of the image acquisition apparatus 500. The processor 510 is configured to execute computer-readable instructions. In some embodiments, the processor 510 may also include one or more components (not shown) to facilitate interaction between the processor 510 and the first image sensor 530, the second image sensor 540, and/or the user input/output interface 550.

The memory 520 may store a plurality of computer-readable instructions, images captured by the first image sensor 530 and the second image sensor 540, and/or other data to support operation of the image acquisition apparatus 500. The memory 520 may be any type of volatile or non-volatile memory or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disk.

The first image sensor 530 and the second image sensor 540 may be a same type of image sensors or different types of image sensors. For example, each of the first image sensor 530 and the second image sensor 540 can include a CCD image sensor, a CMOS image sensor, or another type of image sensor, which is not limited by the present disclosure. Further, each of the first image sensor 530 and the second image sensor 540 may be a visible-light image sensor, an infrared image senor, or an image sensor configured to sense light within another wavelength range, which is not limited by the present disclosure. For example, the visible-light image sensor can sense light in a visible-light wavelength range (e.g., about 390 nm to about 700 nm) and capture a visible-light image. The infrared image sensor can sense light in an infrared wavelength range (e.g., about 700 nm to about 1 mm) and capture an infrared image. The image sensor configured to sense light within other wavelength ranges can include, for example, a UV image sensor, which can sense light in a UV wavelength range (e.g., about 10 nm to about 400 nm) and capture a UV image. Accordingly, an image captured by the first image sensor 530 or an image captured by the second image sensor 540 may be the visible-light image, the infrared image, the UV image, or an image containing certain colors, which is not limited by the present disclosure.

The user input/output interface 550 may be a display device, a touch control display device, keyboard, buttons or a combination thereof. For example, if the user input/output interface 550 is a touch control display device, the touch control display device may display images to a user through a screen of the touch control display device, and the user can input instructions to the image acquisition apparatus 500 by touching touch sensors of the touch control display device.

In some embodiments, the computer-readable instructions can be executed by the processor 510 to cause the processor 510 to implement a method consistent with the disclosure, such as the example image presenting method 100 described above in connection with FIG. 1. In some embodiments, the instructions can cause the processor 510 to obtain a first image through the first image sensor 530, obtain a second image through the second image sensor 540, convert the first image into a first intermediate image, convert the second image into a second intermediate image including a plurality of components, fuse one of the plurality of components of the second intermediate image with the first intermediate image to obtain a fused component, and combine the fused component and other ones of the plurality of components of the second intermediate image to obtain a target image.

In some embodiments, the first image and the second image may correspond to the same or similar photographing scene. The photographing scene may include one or more target objects. A representation of a target object in the first image matches a representation of a target object in the second image. In some embodiments, a representation of each of the one or more target objects in the first image matches a representation of each of the one or more target objects in the second image.

In some embodiments, the first image and the second image can be images captured by the first image sensor 530 and the second image sensor 540, respectively, without undergoing any pre-processing, such as calibration. The first image and the second image can be captured at the same time, or at different times, and can have the same or similar contents. In one example, for the same photographing scene, if the first image and the second image are captured at the same time, the first image and the second image can have the same or similar contents. In another example, for a same stationary photographing scene, even if the first image and second image are not captured at the same time, the first image and the second image can still include the same or similar contents because, e.g., the scene does not change. The first image and the second image may be captured by the same image acquisition apparatus (e.g., a camera), or different image acquisition apparatuses (e.g., different cameras).

In some embodiments, the image acquisition apparatus 500 may further include a beam splitter (not shown) to split a beam of incident light to a first beam (e.g., a visible-light portion of the incident light) and a second beam (e.g., an infrared portion of the incident light). The first image sensor 530 can capture the first image by sensing the first beam, and the second image sensor 540 can capture the second image by sensing the second beam. In this case, a field of view (FOV) of the first image is the same as an FOV of the second image. A representation of a target object in the first image matches a representation of a target object in the second image. In some embodiments, a representation of each of the one or more target objects in the first image matches a representation of each of the one or more target objects in the second image.

In some other embodiments, the first image and the second image are obtained by processing a first raw image and a second raw image, respectively. The first raw image and the second raw image can be captured at the same time, or at different times, and can have the same or similar contents. In one example, for the same photographing scene, if the first raw image and the second raw image are captured at the same time, the first raw image and the second raw image can have the same or similar contents. In another example, for a same stationary photographing scene, even if the first raw image and second raw image are not captured at the same time, the first raw image and the second raw image can still include the same or similar contents because, e.g., the scene does not change. The first raw image and the second raw image may be captured by the same image acquisition apparatus (e.g., a camera), or different image acquisition apparatuses (e.g., different cameras).

In some embodiments, the first raw image may be captured by the first image sensor 530 by sensing incident light of a first photographing scene, and the second raw image may be captured by the second image sensor 540 by sensing incident light of a second photographing scene. The first photographing scene is similar to or same as the second photographing scene. The relation between the first photographing scene and the second photographing scene may be related to an arrangement of the first image sensor 530 and the second image sensor 540. For example, the first image sensor 530 and the second image sensor 540 may be disposed at different positions inside the image acquisition apparatus 500. FIGS. 2A and 2B show example arrangements of the first image sensor 530 and the second image sensor 540 consistent with embodiments of the disclosure. As shown in FIG. 2A, the first image sensor 530 and the second image sensor 540 are disposed with a distance d1 and a distance d2, respectively, relative to an optical axis of a lens inside the image acquisition apparatus 500. A line connecting the first image sensor 530 and the second image senor 540 may be perpendicular to the optical axis. The distance d1 may be equal to or different from the distance d2 according to actual product design requirements and/or manufacture conditions. The example arrangement, shown in FIG. 2B, is similar to that shown in FIG. 2A, except that in the arrangement shown in FIG. 2B, the line connecting the first image sensor 530 and the second image sensor 540 is not perpendicular to the optical axis.

The first raw image and the second raw image can be processed to obtain the first image and the second image, respectively. In some embodiments, the first raw image may be calibrated according to the second raw image to generate the first image, and the second raw image can be set as the second image. In some other embodiments, the second raw image may be calibrated according to the first raw image to generate the second image, and the first raw image can be set as the first image.

In some other embodiments, the first raw image and the second raw image can be both calibrated, for example, according to a calibration assembly (not shown) of the image acquisition apparatus 500, to generate the first image and the second image. The calibration assembly may be a calibration board. Through the calibration assembly, the image acquisition apparatus 500 can obtain calibration parameters, e.g. parameters related to pixel coordinates. According to the calibration parameters, the first raw image and the second raw image can be calibrated to generate the first image and the second image, respectively.

In some embodiments, calibration of a raw image, e.g., the first raw image or the second raw image, can include rotating, resizing, and/or translationally moving the raw image. In some embodiments, calibration of the raw image can additionally or alternatively include tailoring the raw image according to another raw image or according to the calibration assembly. In some embodiments, the first image obtained by calibrating the first raw image may have the same resolution as the second image obtained by calibrating the second raw image. In some other embodiments, the first image may have different resolution from the second image. For example, the first image may have a larger resolution than the second resolution.

In some embodiment, the first image may be a visible-light image acquired through a visible-light image sensor as the first image sensor 530, and the second image may be an infrared image acquired through an infrared image sensor as the second image sensor 540.

The first image can be an image of any suitable color model (color space), such as an RGB (red, green, and blue) image, an HSV (hue, saturation, and value (brightness)) image, an HSL (hue, saturation, and lightness) image, an Lab (lightness, green-red (a-component), and blue-yellow (b-component)), a YUV (luminance, blue-chrominance, and red-chrominance) image, a Y'UV (luma, blue-chrominance, and red-chrominance), a YCbCr (luminance, blue-difference, and red-difference), a YPbPr (analog version of YCbCr), or a CMYK (cyan, magenta, yellow, and black) image. The first intermediate image can be an image having only one component indicating associated light intensity, such as a grayscale image.

In some embodiments, the first image can be an image of a color model without an individual intensity-related component (such as an RGB image or a CMYK image). In these embodiments, the first image can be converted to the first intermediate image according to any suitable approach. For example, the first image may be an RGB image, and each of the R-component, G-component, and B-component may carry corresponding grayscale information. The grayscale information of any of the three components can be extracted to form a grayscale image as the first intermediate image, or the grayscale information of any two or more of the three components can be extracted and combined to form the grayscale image. Alternatively, the RGB image may be converted to another type of image having an individual intensity-related component, e.g., an HSV image, an HSL image, an Lab image, a YUV image, a Y'UV image, a YCbCr image, or a YPbPr image, the intensity-related component (V-component of the HSV image, L-component of the HSL image, L-component of the Lab image, Y-component of the YUV image, Y'-component of the Y'UV image, Y-component of the YCbCr image, or Y-component of the YPbPr image) of which can be extracted to form the grayscale image as the first intermediate image. If the first image is a CMYK image, it can be processed in a similar manner as the RGB image to obtain a grayscale image as the first intermediate image.

In some embodiments, the first image can be an image of a color model with an individual intensity-related component (such as an HSV image, an HSL image, an Lab image, a YUV image, a Y'UV image, a YCbCr image, or a YPbPr image, which includes one component representing the lightness, brightness, gray level or other similar image features), and can be acquired through the first image sensor 530 or converted from an RGB image or another type of image. In these embodiments, the intensity-related component (such as the V-component of the HSV image, the L-component of the HSL image, the L-component of the Lab image, the Y-component of the YUV image, the Y'-component of the Y'UV image, the Y-component of the YCbCr image, or the Y-component of the YPbPr image) can be extracted to form a grayscale image as the first intermediate image.

The second image can be an image of any suitable color model (color space), such as an RGB image, an HSV image, and HSL image, an Lab image, a YUV image, a Y'UV image, a YCbCr image, a YPbPr image, or a CMYK image. The second intermediate image can be an image having a plurality of components (e.g., three components) and one of the components indicates associated light intensity.

In some embodiments, the second image can be an image of a color model without an individual intensity-related component (such as an RGB image or a CMYK image). In these embodiments, the second image can be converted to an image of a color model having an individual intensity-related component (such as an HSV image, an HSL image, an Lab image, a YUV image, a Y'UV image, a YCbCr image, or a YPbPr image) as the second intermediate image, and the intensity-related component of the second intermediate image can be used to fuse with the first intermediate image. For example, the second image can be an RGB image and can be converted into a YUV image as the second intermediate image. The Y-component of the YUV image can be used to fuse with the first intermediate image. Alternatively, the RGB image can be converted into an HSV image, an HSL image, an Lab image, a Y'UV image, a YCbCr image, or a YPbPr image as the second intermediate image, and the V-component of the HSV image, the L-component of the HSL image, the L-component of the Lab image, the Y'-component of the Y'UV image, the Y-component of the YCbCr image, or the Y-component of the YPbPr image can be used to fuse with the first intermediate image. If the second image is a CMYK image, it can be processed in a similar manner as the RGB image to obtain an image having an individual intensity-related component as the second intermediate image.

In some embodiments, the second image can be an image of a color model with an individual intensity-related component (such as an HSV image, an HSL image, an Lab image, a YUV image, a Y'UV image, a YCbCr image, or a YPbPr image, which includes one component representing the lightness, brightness, gray level or other similar image features), and can be acquired through the second image sensor 540 or converted from an RGB image or another type of image. In these embodiments, the second image can be used directly as the second intermediate image, or be converted to another image of a color model with an individual intensity-related component as the second intermediate image.

One of the plurality of components of the second intermediate image is fused with the first intermediate image to obtain a fused component. In some embodiments, the first image (e.g., the visible-light image) can be converted to the grayscale image as the first intermediate image. The second image (e.g., the infrared image) can be converted to the YUV image as the second intermediate image. The YUV image includes the Y-component, the U-component, and the V-component. The Y-component of the YUV image can be fused with the grayscale image to obtain a fused component, e.g., a fused Y-component for a target image.

In some embodiments, the first intermediate image can include a grayscale image formed by a V-component of an HSV image obtained by the first image sensor 530 or derived from another image obtained by the first image sensor 530. The second intermediate image may be another HSV image obtained by the second image sensor 540 or derived from another image obtained by the second image sensor 540. The V-component of the second intermediate image can be fused with the grayscale image to obtain a fused component, e.g., a fused V-component for the target image.

In some embodiments, the first intermediate image can include a grayscale image formed by an L-component of an HSL image obtained by the first image sensor 530 or derived from another image obtained by the first image sensor 530. The second intermediate image may be another HSL image obtained by the second image sensor 540 or derived from another image obtained by the second image sensor 540. The L-component of the second intermediate image can be fused with the grayscale image to obtain a fused component, e.g., a fused L-component for the target image.

In some embodiments, the first intermediate image can include a grayscale image formed by an L-component of an Lab image obtained by the first image sensor 530 or derived from another image obtained by the first image sensor 530. The second intermediate image may be another Lab image obtained by the second image sensor 540 or derived from another image obtained by the second image sensor 540. The L-component of the second intermediate image can be fused with the grayscale image to obtain a fused component, e.g., a fused L-component for the target image.

In some embodiments, the first intermediate image can include a grayscale image formed by a Y'-component of an Y'UV image obtained by the first image sensor 530 or derived from another image obtained by the first image sensor 530. The second intermediate image may be another Y'UV image obtained by the second image sensor 540 or derived from another image obtained by the second image sensor 540. The Y'-component of the second intermediate image can be fused with the grayscale image to obtain a fused component, e.g., a fused Y'-component for the target image.

In some embodiments, the first intermediate image can include a grayscale image formed by a Y-component of an YCbCr image obtained by the first image sensor 530 or derived from another image obtained by the first image sensor 530. The second intermediate image may be another YCbCr image obtained by the second image sensor 540 or derived from another image obtained by the second image sensor 540. The Y-component of the second intermediate image can be fused with the grayscale image to obtain a fused component, e.g., a fused Y-component for the target image.

In some embodiments, the first intermediate image can include a grayscale image formed by a Y-component of an YPbPr image obtained by the first image sensor 530 or derived from another image obtained by the first image sensor 530. The second intermediate image may be another YPbPr image obtained by the second image sensor 540 or derived from another image obtained by the second image sensor 540. The Y-component of the second intermediate image can be fused with the grayscale image to obtain a fused component, e.g., a fused Y-component for the target image.

In some embodiments, the one of the plurality of components of the second intermediate image can be fused with the first intermediate image at the pixel level, i.e., by performing the fusing pixel by pixel. In some embodiments, a fused component of a certain pixel of the target image can be obtained by calculating a weighted sum of a first pixel value at a first pixel of the first intermediate image that corresponds to the certain pixel of the target image and a second pixel value of the one of the plurality of components at a second pixel of the second intermediate image that corresponds to the certain pixel of the target image. That is, the pixel value of the fused component of the certain pixel can be a sum of a multiplication of the first pixel value and a first weight and a multiplication of the second pixel value and a second weight. A sum of the first weight and the second weight can be one (1).

For example, in the scenario that the second intermediate image is a YUV image, the Y-component of the YUV image can be fused with the grayscale image using the following equation.

$$\text{Fused } Y = a \times \text{gray scale} + b \times Y$$

where a is a first weight for the first pixel value at the first pixel of the first intermediate image (e.g., the grayscale image converted from the visible-light image), b is a second weight for the second pixel value of the one (e.g., the Y-component) of the plurality of components at the second pixel of the second intermediate image (e.g., the YUV image converted from the infrared image), and a+b=1.

A similar equation can be applied to fuse the V-component of the HSV image (the second intermediate image) with the grayscale image (the first intermediate image), the L-component of the HSL image (the second intermediate image) with the grayscale image (the first intermediate image), the L-component of the Lab image (the second intermediate image) with the grayscale image (the first intermediate image), the Y'-component.

The weights used in the above fusing process can be determined according to various approaches. In some embodiments, the weights may depend on gradients in the first intermediate image. For example, after the first image is converted to the grayscale image as the first intermediate image, a gradient operator may be applied at the first pixel of the grayscale image to calculate a gradient at the first pixel, and the first and second weights can be determined according to the gradient at the first pixel. In some embodiments, the gradient can be obtained by calculating a change between two or more of pixel values of the first pixel and one or more neighboring pixels in proximity of the first pixel.

In some embodiments, the first weight can be determined according to a gradient at the first pixel of the first intermediate image. For example, the first weight may be positively related to the gradient, e.g., positively proportional to the gradient. The second weight can be determined based on the first weight. For example, the second weight may equal one minus the first weight.

In some embodiments, the first weight can be determined according to an intensity (gray scale) at the first pixel of the first intermediate image. For example, the first weight may be positively related to the intensity (gray scale), e.g., positively proportional to the intensity (gray scale). The second weight can be determined based on the first weight. For example, the second weight may equal one minus the first weight.

In some embodiments, the first intermediate image may be converted to an edge-profile image, and the first weight can be determined according to, such as positively related to, an intensity (gray scale) at a pixel of the edge-profile image corresponding to the first pixel of the first intermediate image. For example, the first intermediate image may include one or more objects, and an edge profile for each of the one or more objects may be determined by, e.g., an edge detection method. The first weight may be related to an intensity of the edge profile. For example, the first weight may be positively proportional to the intensity of the edge profile. The second weight can be determined based on the first weight. For example, the second weight may equal one minus the first weight.

In some embodiments, the instructions stored in the memory 520 may cause the processor 510 to combine the fused component with other ones of the plurality of components of the second intermediate image to obtain the target image.

In the scenario where the second intermediate image is a YUV image, the fused Y-component can be combined with the U-component of the YUV image and the V-component of the YUV image to obtain a fused YUV image as the target image.

In the scenario where the second intermediate image is an HSV image, the fused V-component can be combined with the H-component and S-component of the second intermediate image to obtain a fused HSV image as the target image.

In the scenario where the second intermediate image is an HSL image, the fused L-component can be combined with the H-component and S-component of the second intermediate image to obtain a fused HSL image as the target image.

In the scenario where the second intermediate image is an Lab image, the fused L-component can be combined with the a-component and b-component of the second intermediate image to obtain a fused Lab image as the target image.

In the scenario where the second intermediate image is a Y'UV image, the fused Y'-component can be combined with the U-component and V-component of the second intermediate image to obtain a fused Y'UV image as the target image.

In the scenario where the second intermediate image is a YCbCr image, the fused Y-component can be combined with the Cb-component and Cr-component of the second intermediate image to obtain a fused YCbCr image as the target image.

In the scenario where the second intermediate image is a YPbPr image, the fused Y-component can be combined with the Pb-component and Pr-component of the second intermediate image to obtain a fused YPbPr image as the target image.

In some embodiments, the instructions stored in the memory 520 may further cause the processor 510 to convert the target image to an output image and display the output image through a display screen, for example, the user input/output interface 550. The processor 510 may further process the target image to obtain the output image for displaying through the display screen. For example, the target image may be resized or tailored to obtain the output image according to displaying requirements of the display screen or a user. A type of the output image may be determined according to a device requirement of the display screen. A type of the output image may be same as or different from the target image. For example, the target image may be a YUV image, an HSV image, an HSL image, an Lab image, a Y'UV image, a YCbCr image, a YPbPr image, or another type of image, and the output image may be a different type of image, e.g., an RGB image. In some embodiments, the target image may be output directly as the output image.

Using the image acquisition apparatus 500 shown in FIG. 5, the first image and the second image can be fused to obtain the target image having both desired features of the first image and the second image. Using the image acquisition apparatus 500 to obtain fused images can allow showing of a variety of desired information including distinguishable edges of target objects, heat distribution of the photographing scene, and hidden objects, etc., facilitating applications in, e.g., remote sensing detection, environmental protection, safety navigation, traffic monitoring, or medical image processing.

Figure 6:
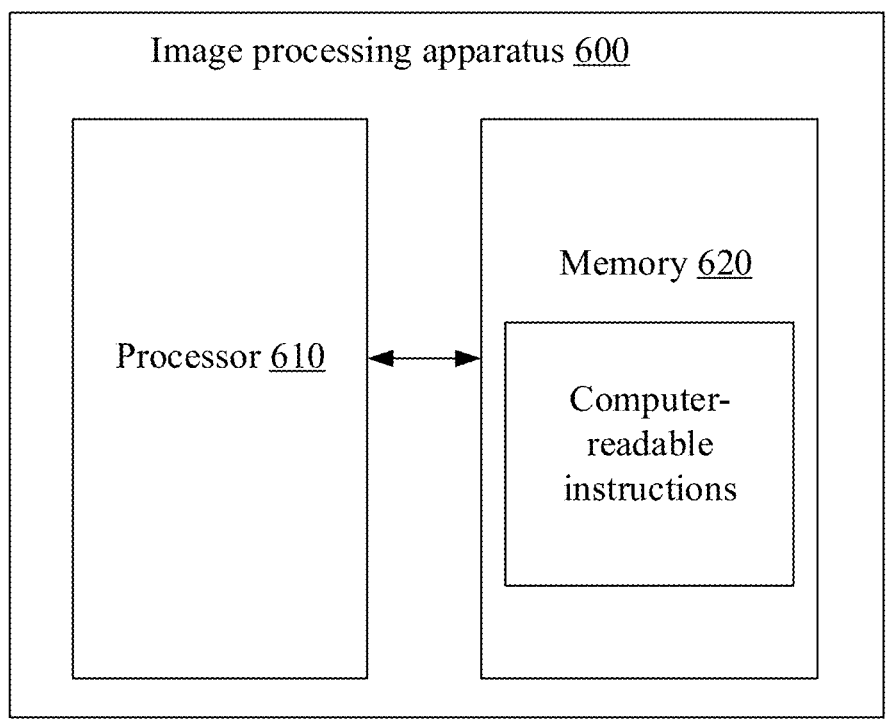
FIG. 6 schematically illustrates a terminal device according to some embodiments of the present disclosure.

Another aspect of the present disclosure provides a terminal device. FIG. 6 shows a terminal device 600 according to some embodiments of the present disclosure. The terminal device 600 may be a digital camera, a remote control connected to an unmanned aerial vehicle, a mobile phone, a tablet, a desktop computer, a laptop computer, etc. As shown in FIG. 6, the terminal device 600 includes a processor 610 and a memory 620. The processor 610 can be configured to control operations, e.g., image acquisition, image processing, and image display, etc., of the terminal device 600. The processor 610 is configured to execute computer-readable instructions stored in the memory 620. The memory 620 may store a plurality of computer-readable instructions of the terminal device 600. The memory 620 may be any type of volatile or non-volatile memory or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

In some embodiments, the computer-readable instructions can be executed by the processor 610 to cause the terminal device 600 to implement a method consistent with the disclosure, such as the example image presenting method 100 described above in connection with FIG. 1. In some embodiments, the instruction can cause the processor 610 to obtain a first image and a second image, convert the first image into a first intermediate image, convert the second image into a second intermediate image including a plurality of components, fuse one of the plurality of components of the second intermediate image with the first intermediate image to obtain the fused component, and combine the fused component and the other ones of the plurality of components of the second intermediate image to obtain a target image.

In some embodiments, the processor 610 can process images sent from an image acquisition apparatus or a server (not shown). The server may store a plurality of images and save a local storage space of the terminal device 600.

In some embodiments, the terminal device 600 also includes a display screen, configured to display images processed and sent by the processer 610.

In some embodiments, the terminal device 600 also includes a user input/output interface. The user input/output interface may be a display, a touch control display, a keyboard, buttons or a combination thereof. For example, the user input/output interface can be a touch control display, through which the user can input instructions input to the terminal device 600.

In some embodiments, the processor 610 may also include one or more components (not shown) to facilitate interaction between the processor 610 and the image acquisition apparatus, the image display unit and the user input/output interface.

For detailed description of parts of the terminal device 600, reference can be made to descriptions of the image acquisition apparatus 500, which are not repeated here.

Using the image acquisition apparatus 600 shown in FIG. 6, the first image and the second image can be fused to obtain the target image having both desired features of the first image and the second image. Using the image acquisition apparatus 600 to obtain fused images can show a variety of desired information including distinguishable edges of target objects, heat distribution of the photographing scene, and hidden objects, etc., facilitating applications in remote sensing detection, environmental protection, safety navigation, traffic monitoring, medical image processing.

For simplification purposes, detailed descriptions of the operations of apparatus, device, and units are omitted, and references can be made to the descriptions of the example methods above.

The disclosed apparatuses, device, and methods may be implemented in other manners not described here. For example, the devices described above are merely illustrative. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physical unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random-access memory (RAM), a magnetic disk, or an optical disk.

Other embodiments of the disclosure will be apparent to those skilled in the art from consideration of the specification and practice of the embodiments disclosed herein. It is intended that the specification and embodiments be considered as examples only and not to limit the scope of the disclosure. Any modification and equivalently replacement for the technical solution of the present disclosure should all fall in the spirit and scope of the technical solution of the present disclosure.

What is claimed is:

1. An image fusing method comprising:
converting a first image into a first intermediate image;
converting a second image into a second intermediate image including a plurality of components;
calculating a gradient at a first pixel of the first intermediate image;
determining a first weight for a first pixel value at the first pixel according to the gradient;
determining, according to the first weight, a second weight for a second pixel value of one of the plurality of components at a second pixel of the second intermediate image;
fusing the one of the plurality of components of the second intermediate image with the first intermediate image to obtain a fused component, including calculating a weighted sum of the first pixel value and the second pixel value based on the first weight for the first pixel value and the second weight for the second pixel value; and
combining the fused component and other ones of the plurality of components of the second intermediate image to obtain a target image.

2. The method of claim 1, further comprising:
converting the target image into an output image; and
displaying the output image through a display screen.

3. The method of claim 2, wherein:
a type of the target image is same as a type of the second intermediate image, the type of the target image including one of an HSV image, an HSL image, an Lab image, a YUV image, a Y'UV image, a YCbCr image, and a YPbPr image; and
a type of the output image is different from the type of the target image, the type of the output image including an RGB image.

4. The method of claim 1, wherein a first representation of a target object in the first image matches a second representation of the target object in the second image.

5. The method of claim 1, wherein a resolution of the first image is same as or larger than a resolution of the second image.

6. The method of claim 1, further comprising:
obtaining the first image and the second image through a first image sensor and a second image sensor, respectively.

7. The method of claim 6, wherein:
the first image is a visible-light image acquired through a visible-light image sensor as the first image sensor; and
the second image is an infrared image acquired through an infrared image sensor as the second image senor.

8. The method of claim 1, further comprising:
receiving a first raw image acquired by a first image sensor;
receiving a second raw image acquired by a second image sensor; and
processing the first raw image and the second raw image by one of:
calibrating the first raw image according to a calibration assembly to generate the first image, and calibrating the second raw image according to the calibration assembly to generate the second image;
calibrating the first raw image according to the second raw image to generate the first image, and setting the second raw image as the second image; and
calibrating the second raw image according to first raw image to generate the second image, and setting the first raw image as the first image.

9. The method of claim 8, wherein:
calibrating the first raw image includes at least one of rotating, resizing, translationally moving, or tailoring the first raw image; and
calibrating the second raw image includes at least one of rotating, resizing, translationally moving, or tailoring the second raw image.

10. The method of claim 1, wherein:
the second weight equals one minus the first weight; and
the first weight is positively correlated to the gradient.

11. The method of claim 1, wherein calculating the gradient for the first pixel of the first intermediate image includes:
calculating the gradient at the first pixel based on a change between two or more of pixel values of the first pixel and one or more neighboring pixels in proximity of the first pixel.

12. The method of claim 1, wherein:
converting the first image into the first intermediate image includes converting the first image into a grayscale image; and
the pixel value of the first pixel include grayscale value of the first pixel.

13. The method of claim 12, wherein:
converting the second image into the second intermediate image includes converting the second image into a YUV image including a Y-component, a U-component, and a V-component.

14. The method of claim 13, wherein:
fusing the one of the plurality of components of the second intermediate image with the first intermediate image to obtain the fused component includes fusing the Y-component of the YUV image with the grayscale image to obtain a fused Y-component; and
combining the fused component and the other ones of the plurality of components of the second intermediate image to obtain the target image includes combing the fused Y-component, the U-component of the YUV image, and the V-component of the YUV image to obtain a fused YUV image as the target image.

15. The method of claim 1, wherein calculating the gradient at the first pixel of the first intermediate image includes:
    calculating the gradient at the first pixel of the first intermediate image by applying a gradient operator at the first pixel.

16. An image acquisition apparatus comprising:
    a first image sensor;
    a second image sensor;
    a processor coupled to the first image sensor and the second image sensor; and
    a memory coupled to the processor and storing instructions that, when executed by the processor, cause the processor to:
        obtain a first image through the first image sensor;
        obtain a second image through the second image sensor;
        convert the first image into a first intermediate image;
        convert the second image into a second intermediate image including a plurality of components;
        calculate a gradient at a first pixel of the first intermediate image, by applying a gradient operator at the first pixel to calculate a change between two or more of pixel values of the first pixel and one or more neighboring pixels in proximity of the first pixel;
        determine a first weight for a first pixel value at the first pixel according to the gradient;
        determine, according to the first weight, a second weight for a second pixel value of one of the plurality of components at a second pixel of the second intermediate image;
        fuse the one of the plurality of components of the second intermediate image with the first intermediate image to obtain a fused component, including calculating a weighted sum of the first pixel value and the second pixel value based on the first weight for the first pixel value and the second weight for the second pixel value; and
        combine the fused component and other ones of the plurality of components of the second intermediate image to obtain a target image.

17. An image fusing method comprising:
    obtaining a grayscale image;
    obtaining a color image including a plurality of components;
    combining, by weighted fusion, the grayscale image with one of the plurality of components of the color image to obtain a fused component, a first weight for a first pixel of the grayscale image in the weighted fusion depending on a gradient at the first pixel of the grayscale image, and a second weight for the one of the plurality of components at a second pixel of the color image in the weighted fusion depending on the first weight; and
    combining the fused component and other ones of the plurality of components of the color image to obtain a target image.

* * * * *